US011701746B2

(12) United States Patent
Eto et al.

(10) Patent No.: US 11,701,746 B2
(45) Date of Patent: Jul. 18, 2023

(54) END MILL INSPECTION DEVICE

(71) Applicant: MITSUBISHI HEAVY INDUSTRIES, LTD., Tokyo (JP)

(72) Inventors: Jun Eto, Tokyo (JP); Hirokazu Unno, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 245 days.

(21) Appl. No.: 17/290,447

(22) PCT Filed: Dec. 24, 2019

(86) PCT No.: PCT/JP2019/050533
§ 371 (c)(1),
(2) Date: Apr. 30, 2021

(87) PCT Pub. No.: WO2020/174853
PCT Pub. Date: Sep. 3, 2020

(65) Prior Publication Data
US 2021/0379719 A1 Dec. 9, 2021

(30) Foreign Application Priority Data
Feb. 27, 2019 (JP) .................. 2019-034449

(51) Int. Cl.
*B23Q 17/20* (2006.01)
*B23C 5/10* (2006.01)
(Continued)

(52) U.S. Cl.
CPC ............... *B23Q 17/20* (2013.01); *B23C 5/10* (2013.01); *B23Q 17/24* (2013.01); *G01B 11/255* (2013.01)

(58) Field of Classification Search
CPC .... B23Q 17/20; B23Q 17/22; B23Q 17/2233; B23Q 17/24
(Continued)

(56) References Cited

U.S. PATENT DOCUMENTS 5,255,199 A * 10/1993 Barkman ............. G05B 19/401
382/152
8,160,738 B2 * 4/2012 Nishikawa ............. G01B 21/04
700/193
(Continued)

FOREIGN PATENT DOCUMENTS

JP H09041863 A 2/1997
JP 2001071209 A 3/2001
(Continued)

OTHER PUBLICATIONS

International Search Report and Written Opinion of International Application No. JP/2019/050533 dated Mar. 24, 2020; 15pp.
(Continued)

*Primary Examiner* — George B Bennett
*Assistant Examiner* — G. Bradley Bennett
(74) *Attorney, Agent, or Firm* — Kanesaka Berner and Partners LLP

(57) ABSTRACT

An end mill inspection device, which inspects an end mill having a blade part formed in a curved convex shape or an arc shape, includes: an imaging data acquisition unit that acquires imaging data obtained by capturing an image of a blade part of the end mill by an imaging unit; a contour extraction unit that extracts the contour of the blade part on the basis of the imaging data acquired by the imaging data acquisition unit; and a curvature radius calculation unit that calculates a curvature radius of the contour on the basis of the contour of the blade part extracted by the contour extraction unit.

6 Claims, 10 Drawing Sheets

(51) Int. Cl.
*B23Q 17/24* (2006.01)
*G01B 11/255* (2006.01)

(58) Field of Classification Search
USPC .......................................... 33/628, 630, 642
See application file for complete search history.

(56) References Cited

U.S. PATENT DOCUMENTS

| | | | |
|---|---|---|---|
| 11,472,055 B2 * | 10/2022 | Iida | .......................... B26D 3/065 |
| 2005/0025584 A1 | 2/2005 | Kolker | |
| 2010/0172703 A1 | 7/2010 | Neubold | |
| 2013/0176429 A1 * | 7/2013 | Kurahashi | ............. B23Q 17/249 |
| | | | 348/142 |
| 2016/0039014 A1 | 2/2016 | Uenishi | |
| 2019/0061088 A1 * | 2/2019 | Ootou | ................. B23Q 17/2409 |
| 2020/0039109 A1 * | 2/2020 | Choong | .................... B28D 5/02 |
| 2020/0061723 A1 * | 2/2020 | Eto | ............................ B23C 5/10 |
| 2020/0246931 A1 * | 8/2020 | Fukushima | ......... B23Q 17/2428 |
| 2022/0250201 A1 * | 8/2022 | Jacot | ................... B23Q 17/2457 |

FOREIGN PATENT DOCUMENTS

| | | |
|---|---|---|
| JP | 2001269844 A | 10/2001 |
| JP | 2010520064 A | 6/2010 |
| JP | 5437679 B2 | 10/2010 |
| JP | 2012091288 A | 5/2012 |
| JP | 5021957 B2 | 9/2012 |
| JP | 2013210334 A | 10/2013 |
| JP | 2014169961 A | 9/2014 |
| JP | 2016024048 A | 2/2016 |
| JP | 2016036869 A | 3/2016 |
| JP | 2017226035 A | 12/2017 |
| JP | 6399675 B1 | 10/2018 |

OTHER PUBLICATIONS

Office Action for Japanese Application No. 2019-034449 dated Apr. 5, 2022; 6 pp.

* cited by examiner

END MILL INSPECTION DEVICE

RELATED APPLICATIONS

The present application is a National Phase of International Application Number PCT/JP2019/050533 filed Dec. 24, 2019 and claims priority of Japanese Application Number 2019-034449 filed Feb. 27, 2019.

TECHNICAL FIELD

The present disclosure relates to an end mill inspection device.

BACKGROUND ART

When a plate-like aircraft structural component such as the skin or the like of a fuselage or a main wing is produced, a compound curved surface may be formed in a plate-like component (workpiece) by machining. The compound curved surface is generally formed by contouring or streaking using a ball end mill or a radial end mill.

Unlike the ball end mill or the radial end mill, there is a cutting tool called a barrel tool or a lens tool which includes an arc portion having a curved convex shape in an outer peripheral edge or a bottom edge and in which the curvature radius of the arc portion is large. The curvature radius of the arc portion is larger than the tool diameter (outer diameter) of the end mill.

The lens tool including the arc portion having a curved convex shape in the bottom edge is used when a bottom surface (surface shape) is formed in a workpiece. Accordingly, the feed interval (peak feed) can be made larger than when the ball end mill is used, and a reduction in processing time or an improvement in surface roughness can be obtained.

CITATION LIST

Patent Literature

[PTL 1] Japanese Unexamined Patent Application Publication No. 2017-226035

SUMMARY OF INVENTION

Technical Problem

When the value of the curvature radius is changed by wear, processing by the outer peripheral edge or the bottom edge having a large curvature radius described above affects the surface roughness caused by the processing or the height of a ridge formed between paths. Therefore, in order to maintain the quality of the processed surface, it is necessary to inspect the end mill for a change in shape caused by wear, and it is required to measure the entirety of the edge of the end mill.

In PTL 1, when a tool image acquired by imaging and comparison reference data are compared with each other, the coordinates are corrected such that the intervals between reading points at two points coincide with each other, and it is determined whether or not the amount of a change in shape at one or a plurality of locations of the edge exceeds a determination value. Since the change in shape is determined by calculating the amount of a change in shape for each position, this technique is not suitable for inspection of the end mill including the outer peripheral edge or the bottom edge having a large curvature radius, which requires detection of a slight change in shape.

The present disclosure has been made in view of such circumstances, and an object of the present disclosure is to provide an end mill inspection device capable of accurately detecting a change in shape of an end mill.

Solution to Problem

According to an aspect of the present disclosure, there is provided an end mill inspection device that inspects an end mill including a cutting edge formed in a curved convex shape and in an arc shape, the device including: a first acquisition unit that acquires imaging data of the cutting edge of the end mill, which is captured by an imaging unit; a contour extraction unit that extracts a contour of the cutting edge based on the imaging data acquired by the first acquisition unit; and a curvature radius calculation unit that calculates a curvature radius of the contour based on the contour of the cutting edge extracted by the contour extraction unit.

According to this configuration, the imaging data of the cutting edge of the end mill captured by the imaging unit is acquired, and the contour of the cutting edge of the end mill is extracted based on the acquired imaging data. Then, the curvature radius of the contour is calculated based on the extracted contour of the cutting edge. Therefore, the absolute value of the curvature radius of the contour of the cutting edge can be directly obtained. Since the cutting edge has a small curvature, and has a shape close to a flat shape, when contour data extracted from the imaging data of the actual end mill and contour data of the end mill which is a reference are compared with each other by fitting, it may not be able to distinguish wear of the end mill. On the other hand, since comparison is performed based on the absolute values, even when the shape has a small curvature, wear of the end mill can be distinguished, and a change in shape of the end mill can be accurately detected. In addition, in an end mill having a complicated shape in which a plurality of cutting edges having different curvatures are smoothly connected to each other, fitting is difficult. On the other hand, since comparison is performed for each cutting edge based on the absolute values, it is not necessary to perform fitting, and an inspection process can be simplified.

The end mill inspection device according to the disclosure may further include a second acquisition unit that acquires reference data regarding a reference shape of the end mill; and a determination unit that determines whether or not there is a change in shape of the cutting edge, based on a difference between a value of a reference curvature radius of the reference data acquired by the second acquisition unit and a value of the curvature radius calculated by the curvature radius calculation unit, and a predetermined threshold value.

According to this configuration, the reference data regarding the reference shape of the end mill is acquired, and the difference between the value of the reference curvature radius of the acquired reference data and the value of the curvature radius calculated by the curvature radius calculation unit is compared with the predetermined threshold value to determine whether or not there is a change in shape of the cutting edge of the end mill. In this case, wear of the cutting edge of the end mill is easily specified.

In the end mill inspection device according to the disclosure, a reference contour based on the reference data acquired by the second acquisition unit and the contour extracted by the contour extraction unit may be compared with each other by fitting to determine the change in shape of the cutting edge.

According to this configuration, the reference data regarding the reference shape of the end mill is acquired, and the reference contour based on the acquired reference data and the contour of the end mill extracted by the contour extraction unit are compared with each other by fitting to determine the change in shape of the cutting edge of the end mill. In this case, chipping occurring in the cutting edge of the end mill is easily specified.

In the end mill inspection device according to the disclosure, the determination unit may determine the change in shape of the cutting edge based on an area between the reference contour and the extracted contour or a distance between the reference contour and the extracted contour.

According to this configuration, when the reference contour based on the acquired reference data and the contour of the end mill extracted by the contour extraction unit are compared with each other by fitting, the change in shape is determined based on the area between the reference contour and the extracted contour or the distance between the reference contour and the extracted contour.

In the end mill inspection device according to the disclosure, the cutting edge of the end mill may include a bottom edge or an outer peripheral edge formed in a curved convex shape and in an arc shape, and a radial edge provided at a corner and formed in an arc shape.

According to this configuration, the bottom edge is formed in a curved convex shape and in an arc shape, and the radial edge is provided at the corner and is formed in an arc shape. In machining in which the end mill rotates around an axis, the radial edge can form a fillet-shaped portion in a shape to be processed, and the bottom edge can form a planar portion adjacent to the fillet-shaped portion.

In the end mill inspection device according to the disclosure, the bottom edge may have a region in which a cutting portion is not formed on an axis of the end mill. In the region of the bottom edge, a center edge may be further provided, the center edge being formed in an arc shape having a smaller radius than a radius of an arc portion of the bottom edge.

According to this configuration, there is no cutting portion having a cutting speed of 0 (zero) since the region in which the cutting edge is not formed on the axis of the end mill is provided in the bottom edge. Therefore, the occurrence of burrs can be reduced. In the region in which the cutting portion is not formed on the axis of the end mill, the center edge is formed in an arc shape having a smaller radius than that of the arc portion of the bottom edge. Accordingly, the surface roughness can be further suppressed as compared with when the center edge is not provided.

Advantageous Effects of Invention

According to the present disclosure, a change in shape of the end mill can be accurately detected, and the quality of a processed surface can be satisfactorily maintained by changing processing conditions or replacing the end mill based on a measurement result.

DESCRIPTION OF EMBODIMENTS

Hereinafter, an end mill inspection device 1 according to one embodiment of the present disclosure will be described with reference to the drawings.

The end mill inspection device 1 according to the present embodiment determines whether or not there is a change in shape of an edge of an end mill 10, based on imaging data of the end mill 10 that is an inspection target, which is captured by a camera 4. The change in shape of the edge is wear or chipping caused by processing using the end mill 10. The end mill 10 is inspected with the end mill inspection device 1 in a state where the end mill 10 is attached to a processing device 20 and can rotate around an axis in the same manner as during processing.

Figure 2:
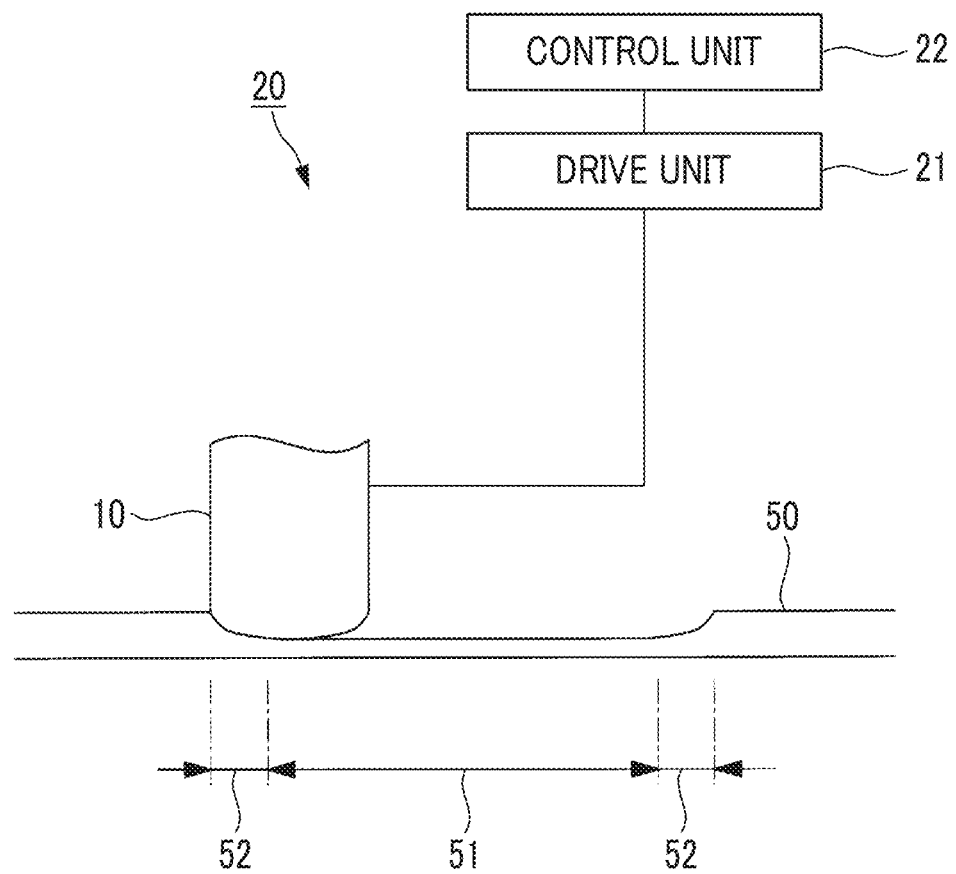
FIG. 2 is a configuration view illustrating a processing device.

As illustrated in FIG. 2, the processing device 20 includes, for example, the end mill 10, a drive unit 21, and a control unit 22. The processing device 20 cuts a workpiece 50 using the end mill 10 to form a predetermined shape in the workpiece 50. The workpiece 50 is a metallic material such as an aluminum alloy or a titanium alloy.

Figure 3:
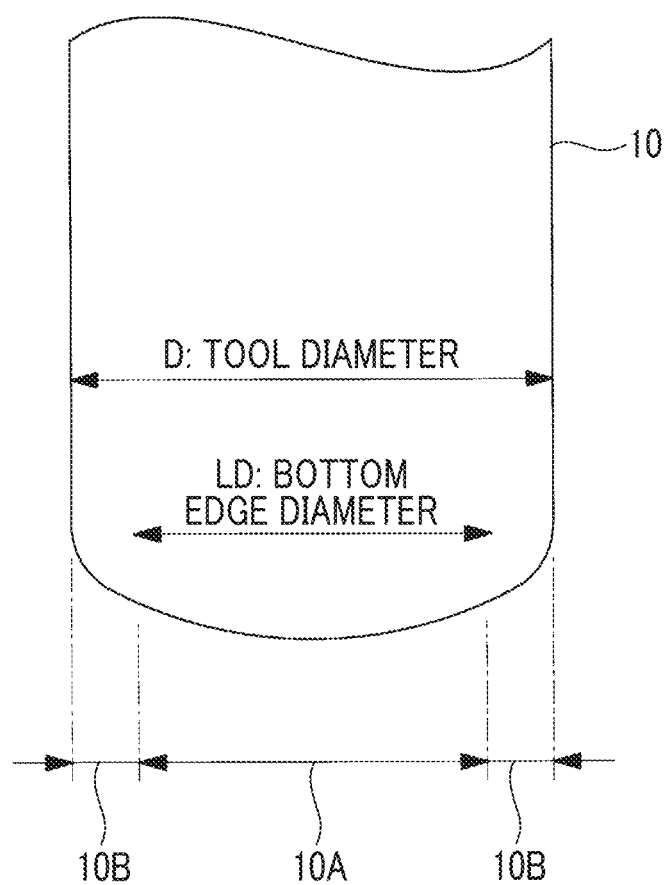
FIG. 3 is a schematic view illustrating a first example of an end mill which is an inspection target.

While rotating around the axis, the end mill 10 can move in an axial direction or a feeding direction to cut the workpiece 50. The end mill 10 is, for example, a lens tool, and as illustrated in FIG. 3, includes a bottom edge 10A that is formed in a curved convex shape, and a radial edge 10B that is provided at a corner and is formed in an arc shape. As illustrated in FIG. 2, when the end mill 10 performs machining while rotating around the axis, the radial edge 10B can form a fillet-shaped portion 52 in a shape to be processed, and the bottom edge 10A can form a planar portion 51 adjacent to the fillet-shaped portion 52. In FIG. 3, the outer diameter (tool diameter) of the end mill 10 is denoted by D, and the diameter (bottom edge diameter) in a region, which is occupied by the bottom edge 10A, in a direction perpendicular to the axial direction of the end mill 10 is denoted by LD.

The bottom edge 10A protrudes such that a portion on the axis of the end mill 10 is located at the lowest position, and is formed in an arc shape having a predetermined radius. The radial edge 10B is provided at an outer peripheral side corner of the bottom edge 10A, and is formed in an arc shape having a predetermined radius. The radius of an arc portion of the bottom edge 10A is larger than the tool diameter of the end mill 10, and is larger than the radius of an arc portion of a so-called ball end mill.

Figure 4:
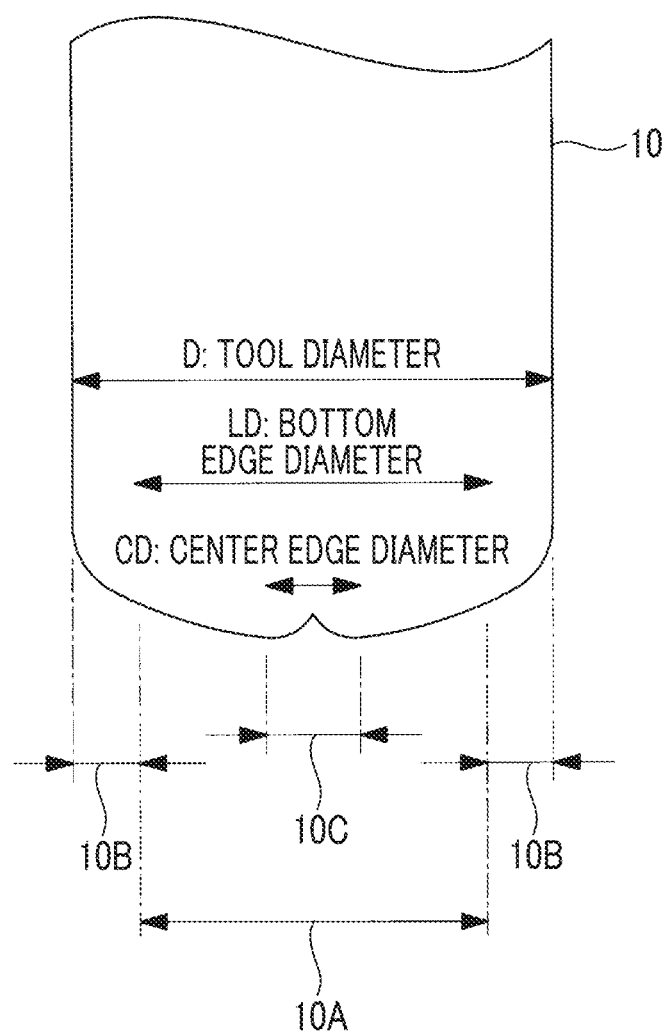
FIG. 4 is a schematic view illustrating a second example of an end mill which is an inspection target.

In addition, when the end mill 10 is a lens tool, a center edge 10C may be formed in the bottom edge 10A. In this case, as illustrated in FIG. 4, the end mill 10 includes the bottom edge 10A that is formed in a curved convex shape, and the radial edge 10B that is provided at the corner and is formed in an arc shape. The bottom edge 10A has a region in which the bottom edge 10A is not formed on the axis of the end mill 10. In addition, the end mill 10 includes the center edge 10C in the region, the center edge 10C being formed in an arc shape having a smaller curvature radius than that of the arc portion of the bottom edge 10A. In FIG. 4, in the bottom edge 10A, the diameter (diameter of the center edge) in a region, in which the cutting portion is formed on the axis of the end mill 10, in the direction perpendicular to the axial direction of the end mill 10 is denoted by CD.

Accordingly, there is no cutting portion having a cutting speed of 0 (zero) since the region in which the cutting edge is not formed on the axis of the end mill 10 is provided in the bottom edge 10A. Therefore, the occurrence of burrs can be reduced. In addition, in the region in which the cutting portion is not formed on the axis of the end mill 10, the center edge 10C is formed in an arc shape having a smaller radius than that of the arc portion of the bottom edge 10A (center edge nose portion). Accordingly, the surface roughness can be further suppressed as compared with when the center edge nose portion having an arc shape is not provided in the center edge 10C.

Incidentally, the end mill 10 may be, for example, a barrel tool, and the barrel tool includes an outer peripheral edge (side edge) that is formed in a curved convex shape, and a radial edge that is formed at a corner and is formed in an arc shape. The end mill inspection device 1 according to the present embodiment is suitable for inspection of the edge of the end mill 10 having a curvature, and can also inspect end mills other than a lens tool or a barrel tool.

Figure 6:
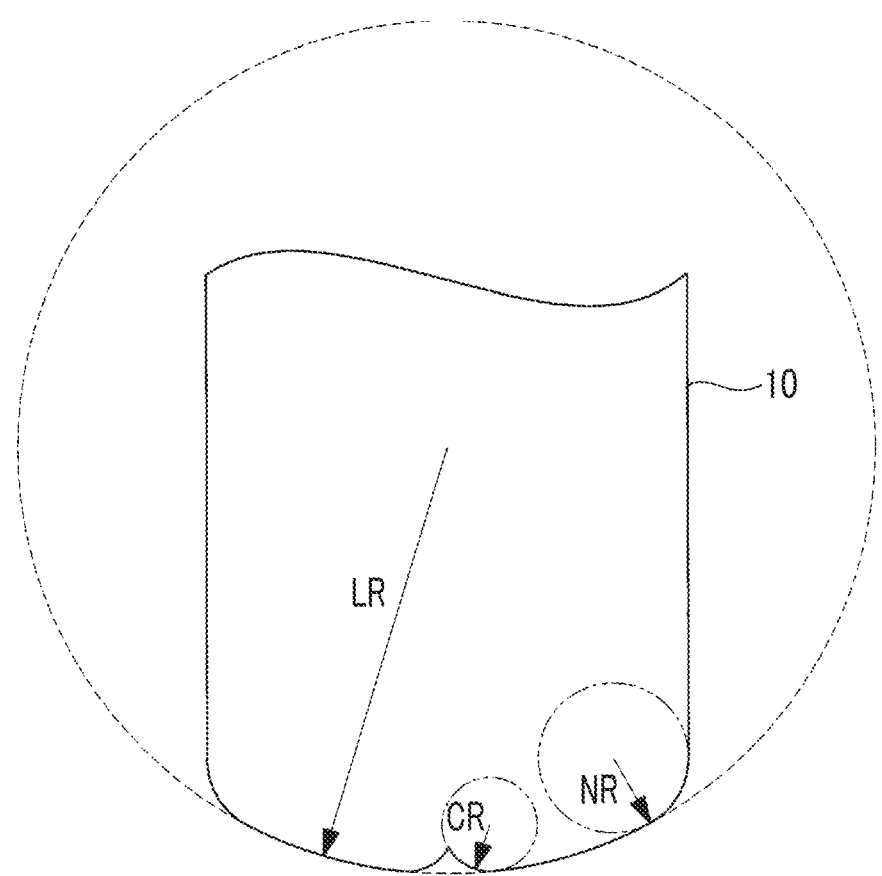
FIG. 6 is a schematic view illustrating a relationship between an end mill and a curvature radius.

In FIG. 6, the curvature radius (lens diameter) of the bottom edge (lens portion) 10A is denoted by LR, the curvature radius (nose diameter) of the radial edge (nose portion) 10B of the end mill 10 is denoted by NR, and the radius (center edge nose diameter) of the arc portion of the center edge 10C in the bottom edge 10A is denoted by CR.

The drive unit 21 of the processing device 20 includes a plurality of motors, a switching unit configured to switch the end mill 10, and the like. A main shaft motor receives electric power to be driven to rotate the end mill 10 around the axis. A motor for movement receives electric power to be driven to move the end mill 10 in the axial direction or the direction perpendicular to the axial direction (feeding direction).

The control unit 22 includes, for example, a central processing unit (CPU), a random access memory (RAM), a read only memory (ROM), a computer-readable storage medium, and the like. Then, as one example, a series of processes for realizing various functions are stored in the storage medium or the like in the form of a program, and the CPU reads the program into the RAM or the like to execute information processing and arithmetic processing, so that the various functions are realized. Incidentally, a form in which the program is installed in the ROM or another storage medium in advance, a form in which the program is provided in a state where the program is stored in the computer-readable storage medium, a form in which the program is distributed via wired or wireless communication means, and the like may be applied. The examples of the computer-readable storage medium include magnetic disks, magneto-optical disks, CD-ROMs, DVD-ROMs, semiconductor memories and the like.

Figure 1:
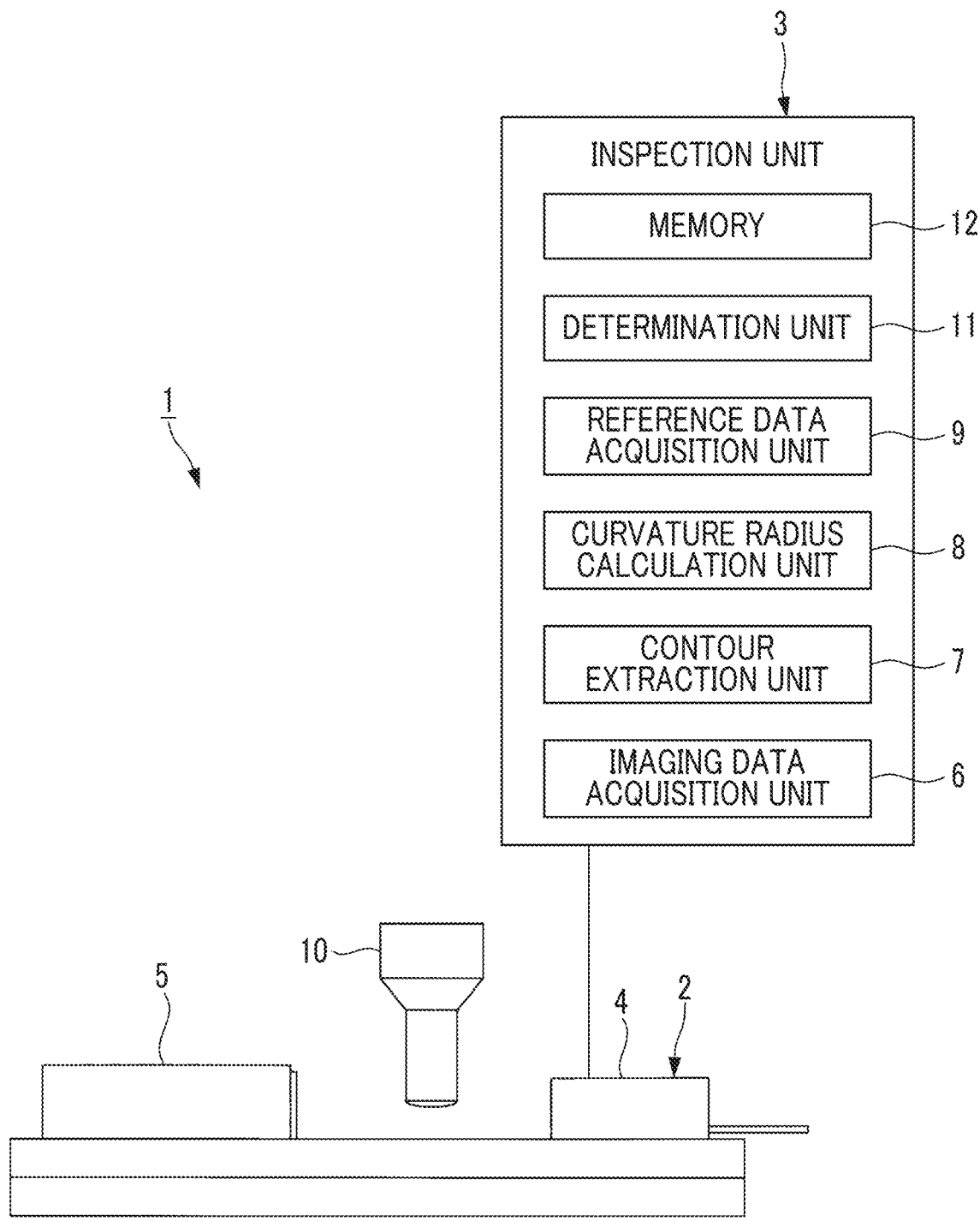
FIG. 1 is a configuration view illustrating an end mill inspection device according to one embodiment of the present disclosure.

As illustrated in FIG. 1, the end mill inspection device 1 includes an imaging unit 2 and an inspection unit 3. In the end mill inspection device 1, the imaging unit 2 acquires imaging data of the end mill 10 which is an inspection target, and the inspection unit 3 determines whether or not there is a change in shape of the edge of the end mill 10, based on the imaging data acquired by the imaging unit 2.

The imaging unit 2 includes the camera 4, a light source device 5, and the like.

The camera 4 can capture an image of the end mill 10. The imaging data acquired by imaging performed by the camera 4 is sent to an imaging data acquisition unit 6. The camera 4 may capture an entire image of the end mill 10 at once, or may partially capture an image of the end mill 10 and capture an entire image while the end mill 10 or the camera 4 is moved.

The camera 4 is disposed such that a lens faces the direction perpendicular to the axial direction of the end mill 10, and captures an image of the end mill 10 in this state. Accordingly, the longitudinal cross-sectional shape of the end mill 10 is acquired by imaging performed by the camera 4.

In the imaging data, an image of the outer shape of the end mill 10, particularly, the outer shape of the edge of the end mill 10 is captured. When images of the end mill 10 are captured in a plurality of times, imaging data may be combined to acquire one imaging data.

The light source device 5 is, for example, an LED, and as illustrated in FIG. 1, is provided on a side opposite to the camera 4 with the end mill 10 which is an inspection target interposed therebetween. The light source device 5 irradiates the end mill 10 with light. Accordingly, a camera 4 side surface in an outer peripheral surface of the end mill 10 is dark, and the camera 4 captures an image of the end mill 10 in a backlight state, so that the outer shape of the end mill 10 is clear.

Incidentally, the imaging unit 2 according to the present disclosure is not limited to the above-described example, and may capture an image of the outer shape of the end mill 10 by other configurations.

The inspection unit 3 includes the imaging data acquisition unit 6, a contour extraction unit 7, a curvature radius calculation unit 8, a reference data acquisition unit 9, a determination unit 11, and the like. Incidentally, hardware resources such as the CPU realizes operation of the inspection unit 3 by executing the program recorded in advance.

The imaging data acquisition unit 6 acquires the imaging data transmitted from the camera 4. The imaging data acquisition unit 6 transmits the acquired imaging data to the contour extraction unit 7.

The contour extraction unit 7 performs image processing on the imaging data acquired by the imaging data acquisition unit 6, to extract the outer shape of the end mill 10, particularly, the contour of the outer shape of the edge of the end mill 10 from the imaging data by the image processing. The contour extraction unit 7 sends data regarding the extracted contour of the end mill 10 to the curvature radius calculation unit 8.

The curvature radius calculation unit 8 calculates the curvature radius of the cutting portion of the end mill 10 based on the data regarding the contour of the end mill 10 extracted by the contour extraction unit 7. For example, when the end mill 10 is a lens tool, the curvature radius of the bottom edge 10A and the curvature radius of the radial edge 10B are calculated. In addition, when the lens tool includes the center edge 10C, the curvature radius of the center edge 10C is also calculated. When the end mill 10 is a barrel tool, the curvature radius of the outer peripheral edge and the curvature radius of the radial edge are calculated.

The reference data acquisition unit 9 acquires reference data regarding the reference shape of the end mill 10, which is recorded in a memory 12, from the memory 12. At that time, the type of the end mill 10 of which the image is captured in the imaging data is specified, and reference data regarding the end mill 10 which is specified is acquired. The end mill 10 may be specified in such a manner that a user inputs an identification symbol of the end mill 10, or may be specified based on a shape, an identification symbol, or the like acquired from the imaging data. The reference data includes data regarding the curvature radius of the edge of the end mill 10 or data regarding the contour shape of the edge of the end mill 10 before being used for processing (use).

Incidentally, the reference data acquisition unit 9 is not limited to acquiring the reference data from the memory 12, and may acquire the reference data from data input by the user whenever measurement is performed.

The determination unit 11 determines a change in shape of the edge of the end mill 10 based on the curvature radius of the reference data (reference curvature radius) acquired by the reference data acquisition unit 9 and the curvature radius calculated by the curvature radius calculation unit 8. At this time, the determination unit 11 determines whether or not there is a change in shape of the edge of the end mill 10, based on a difference between the value of the curvature radius of the acquired reference data and the value of the calculated curvature radius, and a predetermined threshold value. In this case, it can be determined whether or not wear occurs in the edge of the end mill 10.

In addition, the determination unit 11 compares a contour (reference contour) based on the reference data acquired by the reference data acquisition unit 9 with the contour of the end mill 10 extracted by the contour extraction unit 7 by fitting, to determine a change in shape of the edge of the end mill 10. In this case, chipping occurring in the edge of the end mill 10 is easily specified. At this time, the determination unit 11 determines a change in shape based on a distance between the contours or an area between the contours.

Figure 5:
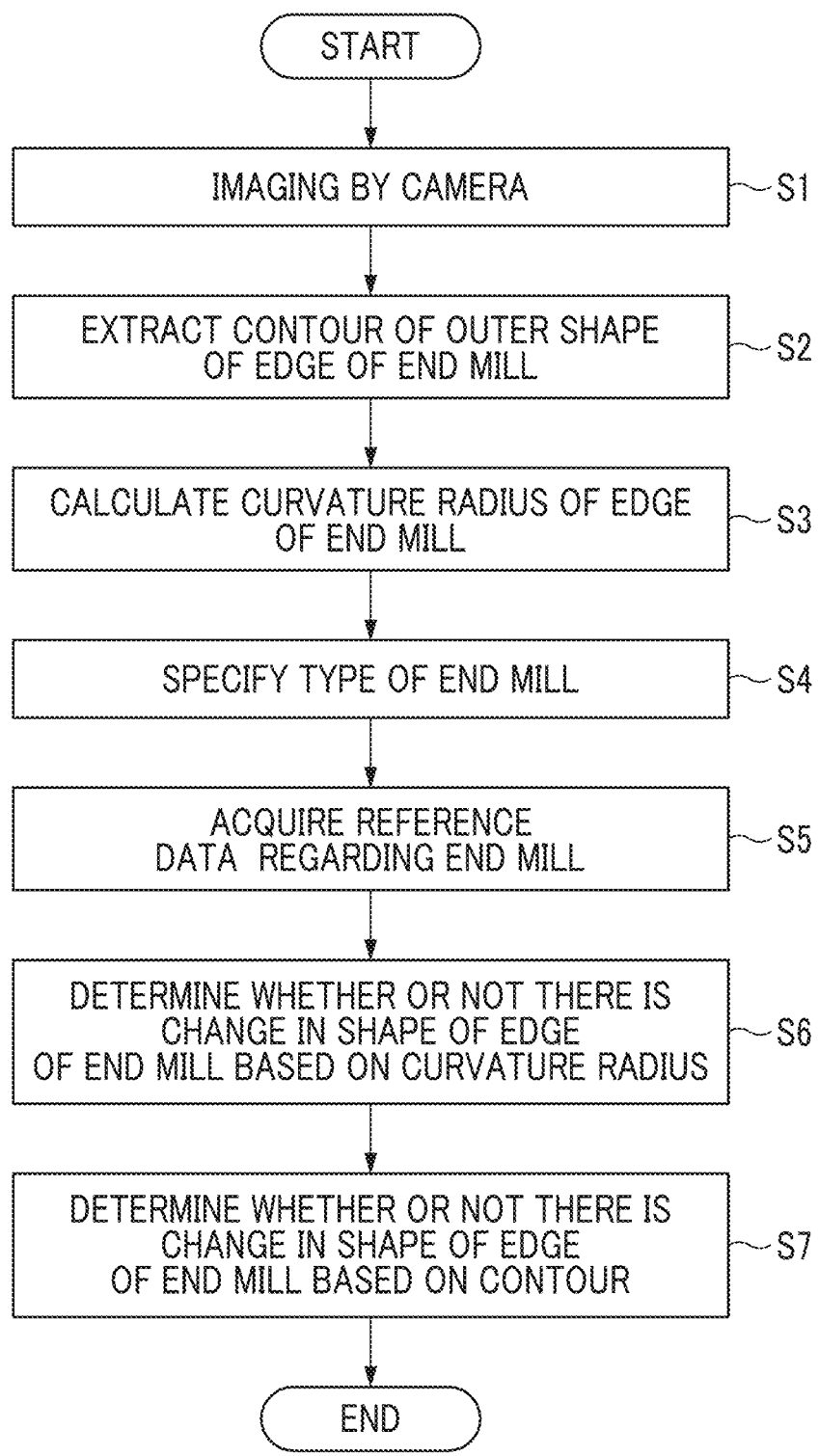
FIG. 5 is a flowchart illustrating operation of the end mill inspection device according to one embodiment of the present disclosure.

Next, a method for inspecting the end mill 10 using the end mill inspection device 1 according to the present embodiment will be described with reference to FIG. 5.

First, the end mill 10 which is an inspection target is installed in the imaging unit 2, and an image of the end mill 10 is captured by the camera 4 (step S1). At this time, the end mill 10 rotates around the axis. When the camera 4 is provided with a wide-angle lens, and the entirety of the edge of the end mill 10 fits in one image, an entire image of the edge of the end mill 10 is captured at once. When the entirety of the edge of the end mill 10 does not fit in an imaging range, an image of the edge of the end mill 10 is partially captured, and an entire image is captured while the end mill 10 or the camera 4 is moved. When the end mill 10 is a lens tool including the bottom edge 10A, the end mill 10 or the camera 4 is moved in parallel to a radial direction of the end mill 10. When the end mill 10 is a barrel tool including an outer peripheral edge, the end mill or the camera 4 is moved in parallel to the axial direction of the end mill 10.

The image data of the end mill 10 captured by the camera 4 is transmitted to the contour extraction unit 7 via the imaging data acquisition unit 6. The contour extraction unit 7 performs image processing on the imaging data to extract the contour of the outer shape of the edge of the end mill 10 from the imaging data by the image processing (step S2). The image processing is, for example, edge detection, and data regarding the contour of the outer shape of the edge of the end mill 10 is acquired by the edge detection.

Then, the curvature radius of the cutting portion of the end mill 10 is calculated based on the data regarding the extracted contour of the edge of the end mill 10 (step S3). Namely, the curvature radius of a curve is calculated from data regarding the curve. When the end mill 10 is a lens tool, and includes the bottom edge 10A and the radial edge 10B, the curvature radius of the bottom edge 10A and the curvature radius of the radial edge 10B are calculated. When the lens tool further includes the center edge 10C, the curvature radius of the center edge 10C is calculated. When the end mill 10 is a barrel tool, and includes an outer peripheral edge and a radial edge, the curvature radius of the outer peripheral edge and the curvature radius of the radial edge are calculated.

In addition, with regard to the end mill 10 which is an inspection target and of which an image is captured by the camera 4, the type, the identification symbol, or the like of the end mill 10 is specified (step S4). For example, the type, the identification symbol, or the like is specified in such a manner that a user inputs the identification symbol of the end mill 10, or are specified based on a shape, an identification symbol, or the like acquired from the imaging data.

When the end mill 10 is specified based on the shape acquired from the imaging data, not only the curvature radius of the cutting portion of the end mill 10, which is extracted from the imaging data captured by the camera 4, but also the tool diameter and the tool length are used. In the end mill 10 with an edge having a large curvature radius, since it is difficult for the user to visually distinguish the type of the end mill 10, when the end mill 10 is specified based on image data, the occurrence of visual misidentification can be suppressed.

Then, reference data regarding the end mill 10 which is specified is acquired (step S5). The reference data is acquired by reading the memory 12 in which reference data regarding a plurality of types of the end mills 10 is recorded in advance, or is acquired in such a manner that the user inputs the reference data.

Next, a difference between the value of the curvature radius of the reference data acquired by the reference data acquisition unit 9 and the value of the curvature radius calculated by the curvature radius calculation unit 8 is compared with the predetermined threshold value to determine whether or not there is a change in shape of the edge of the end mill 10 (step S6). As illustrated in FIG. 6, when the end mill 10 is a lens tool, a difference in the curvature radius LR of the bottom edge 10A, a difference in the curvature radius NR of the radial edge 10B, and a difference in the curvature radius CR of the center edge 10C are calculated. When the end mill 10 is a barrel tool, a difference in the curvature radius of the outer peripheral edge and a difference in the curvature radius of the radial edge are calculated.

Both the value of the curvature radius of the reference data and the value of the calculated curvature radius are absolute values. Then, when a difference between the values of the curvature radii is compared with a predetermined range determined by the predetermined threshold value, and is determined to be out of the predetermined range, it is determined that the edge of the end mill 10 is deformed beyond an allowable shape. On the other hand, when the difference between the values of the curvature radii is compared with the predetermined range, and is determined to be in the predetermined range, it is determined that the edge of the end mill 10 maintains the allowable shape.

As described above, when the edge of the end mill 10 has a small curvature, and has a shape close to a flat shape, it is difficult to distinguish a change in shape of wear by fitting the contours, but it can be detected whether or not there is a change in shape due to chipping 60 (refer to FIGS. 7 to 9) caused by processing.

Figure 7:
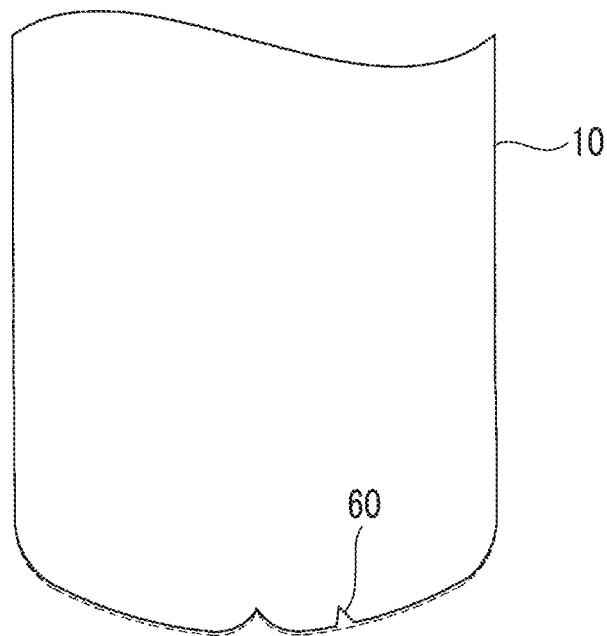
FIG. 7 is a schematic view illustrating an end mill of which images are captured before and after use.
Figure 8:
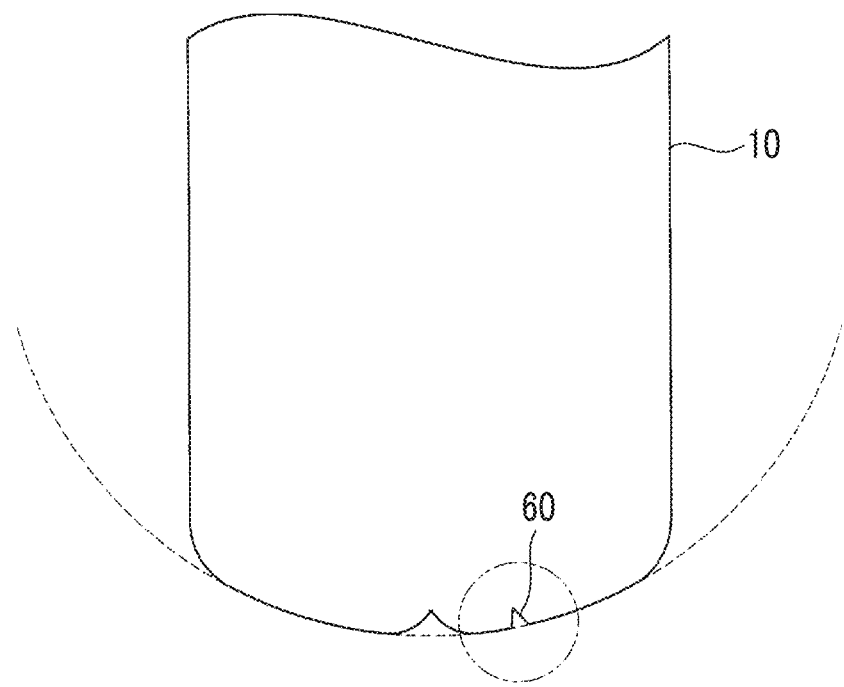
FIG. 8 is a schematic view illustrating a curvature radius based on design data of an end mill and the end mill of which an image is captured after use.
Figure 9:
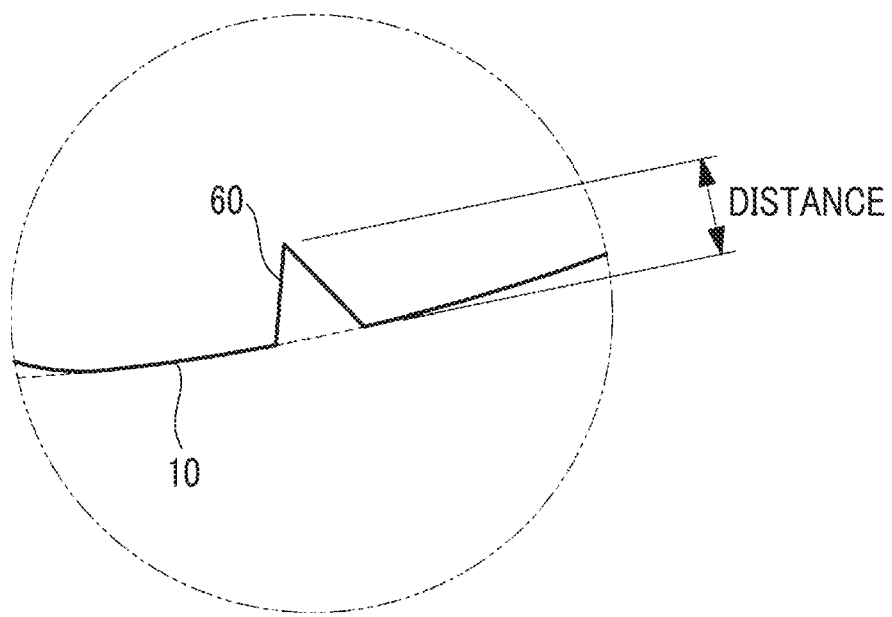
FIG. 9 is an enlarged schematic view illustrating a portion surrounded by a broken line in FIG. 8.

In this case, as illustrated in FIGS. 7 to 9, the contour based on the reference data acquired by the reference data acquisition unit 9 and the contour extracted by the contour extraction unit 7 are compared with each other by fitting to determine whether or not there is a change in shape of the edge of the end mill 10 (step S7). When the end mill 10 is a lens tool, the change in shape of the bottom edge 10A and the change in shape of the radial edge 10B are determined.

For example, the contours are superimposed on each other by a matching process to measure the area of a gap generated between the contours. Alternatively, the contours are superimposed on each other by a matching process to measure a difference in distance generated between the contours in a direction parallel to or in the direction perpendicular to the axial direction. Then, when the area between the contours or the difference in distance between the contours is compared with a predetermined range determined by a predetermined threshold value, and is determined to be out of the predetermined range, it is determined that the edge of the end mill 10 is deformed beyond an allowable shape. On the other hand, when the area between the contours or the difference in distance between the contours is compared with the predetermined range, and is determined to be in the predetermined range, it is determined that the edge of the end mill 10 maintains the allowable shape.

Incidentally, the reference data acquired by the reference data acquisition unit 9 is, for example, as illustrated in FIG. 7, imaging data (broken line portion in FIG. 7) of the end mill 10 before being used for processing (use), which is acquired by imaging performed by the camera 4. Then, image processing is performed on the imaging data of the end mill 10 before use, and the contour of the outer shape of the end mill 10 before use is extracted from the imaging data by the image processing (solid line portion in FIG. 7). Next, the contour of the end mill 10 before use and the contour of the end mill 10 after use are compared with each other to determine whether or not there is a change in shape.

Alternatively, the reference data acquired by the reference data acquisition unit 9 is, for example, as illustrated in FIG. 8, data based on the design value of the end mill 10 (broken line portion in FIG. 8). Then, image processing is performed on the imaging data of the end mill 10 before use, and the contour of the outer shape of the end mill 10 before use is extracted from the imaging data by the image processing (solid line portion in FIG. 8). Next, a contour represented by the data based on the design value of the end mill 10 and the contour of the end mill 10 after use are compared with each other to determine whether or not there is a change in shape.

Figure 11:
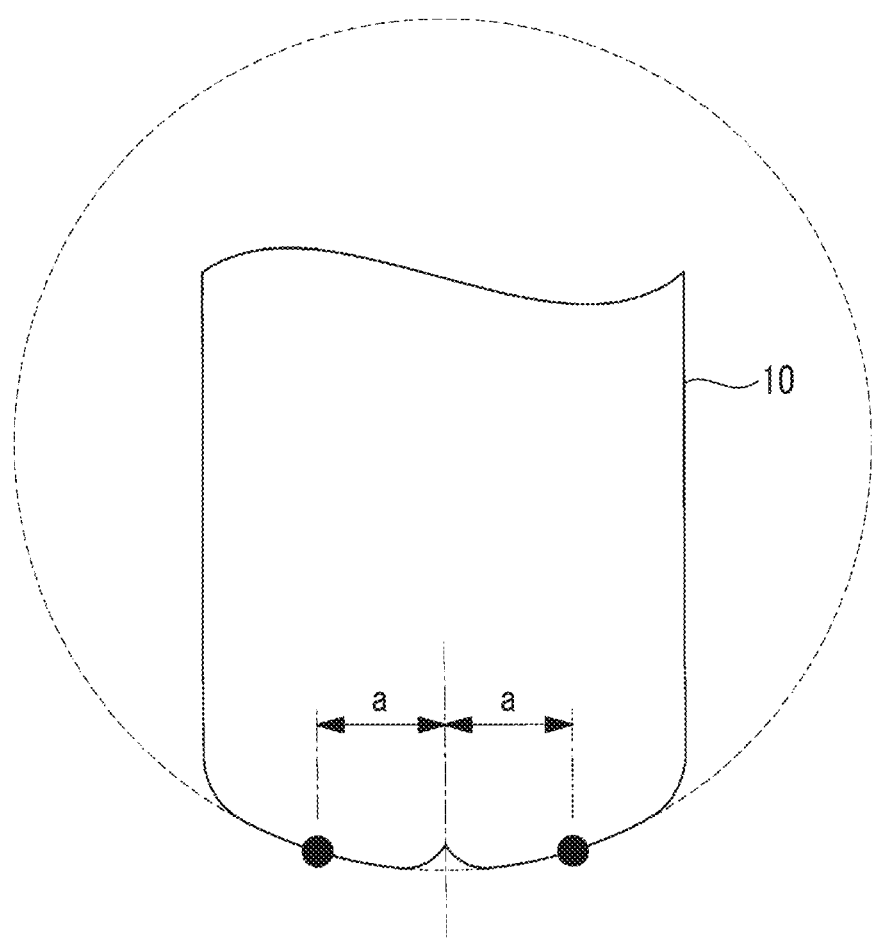
FIG. 11 is a schematic view illustrating a second example of reference points in an end mill, which are used for fitting.
Figure 12:
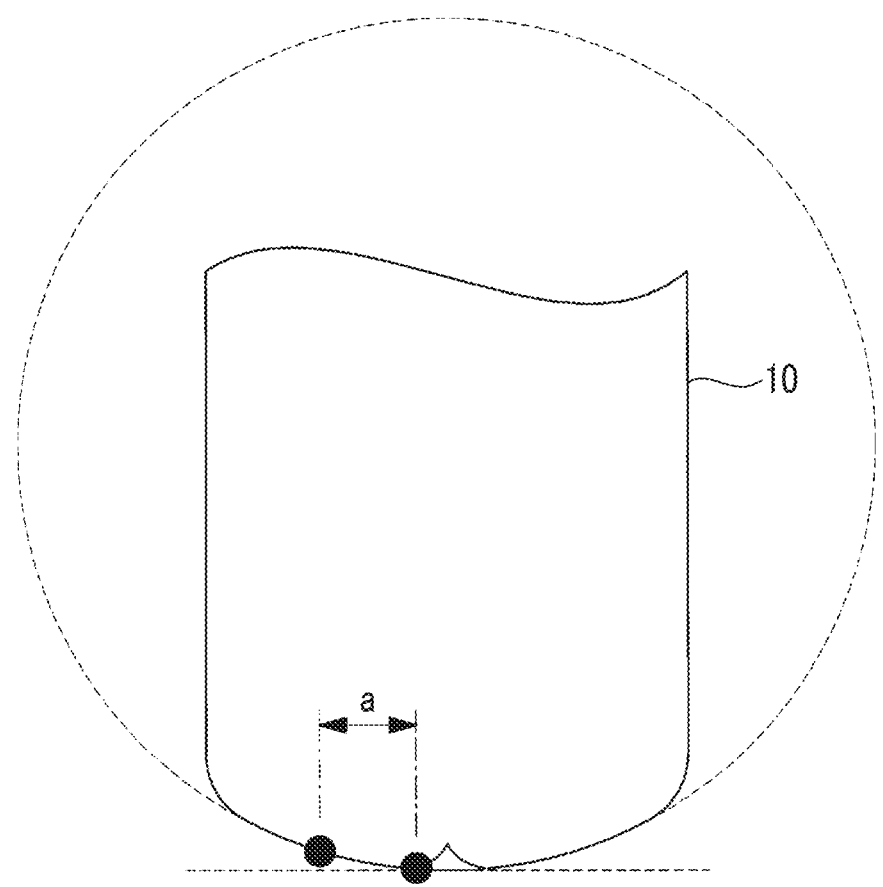
FIG. 12 is a schematic view illustrating a third example of reference points in an end mill, which are used for fitting.

Next, a method for fitting the contour based on the reference data acquired by the reference data acquisition unit 9 and the contour extracted by the contour extraction unit 7 will be described with reference to FIGS. 10 to 12.

Figure 10:
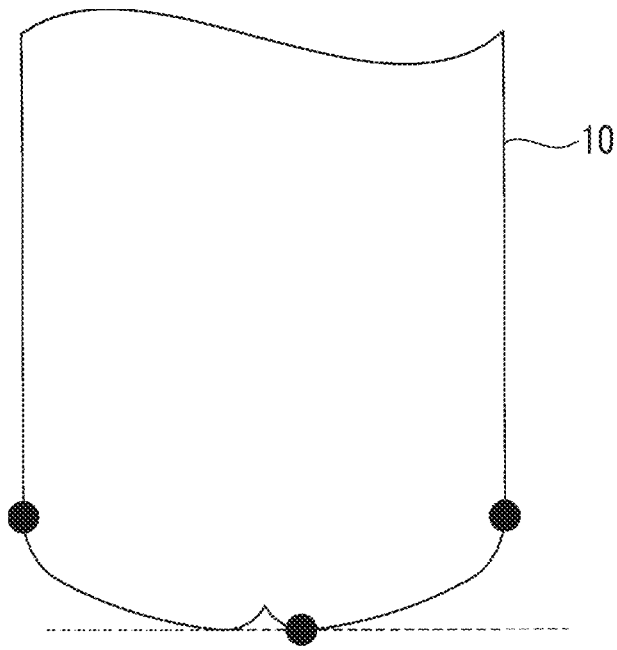
FIG. 10 is a schematic view illustrating a first example of reference points in an end mill, which are used for fitting.

When the reference data acquired by the reference data acquisition unit 9 is the imaging data of the end mill 10 before use, for example, as illustrated in FIG. 10, the reference is a total of three points, namely, two points on both sides of the boundary between a linear axis portion and the radial edge 10B, and one point at an apex of the bottom edge 10A (namely, the lowest point when the edge of the end mill 10 faces downward). Then, when the three points of the reference data and the three points on the contour extracted by the contour extraction unit 7 are closest to each other, both the contours are assumed to be at optimum positions for fitting, and are superimposed on each other, and the above-described comparison is performed.

When the end mill 10 is a lens tool, the bottom edge 10A has a curvature, so that fitting can be performed using the shape of the bottom edge 10A, to improve the fitting accuracy. Therefore, there is a method for using not only the two points on both the sides of the boundary between the linear axis portion and the radial edge 10B but also the apex of the bottom edge 10A as described above.

Alternatively, when the reference data acquired by the reference data acquisition unit 9 is data based on the design value of the end mill 10, for example, two points of the bottom edge 10A are used as a reference. The two points of the bottom edge 10A may be, as illustrated in FIG. 11, two points apart from the center of the tool to the right and left in a horizontal direction by a certain distance a, or may be, as illustrated in FIG. 12, a total of two points, namely, one point at the apex of the bottom edge 10A and one point apart outward from the one point at the apex in the radial direction of the end mill 10 by the certain distance a. Incidentally, the distance a is determined in advance for each of the types of the end mills 10.

Then, when the two points of the reference data and the two points on the contour extracted by the contour extraction unit 7 are closest to each other, both the contours are assumed to be at optimum positions for fitting, and are superimposed on each other, and the above-described comparison is performed.

When the reference data acquired by the reference data acquisition unit 9 is data based on the design value of the end mill 10, curve data of the bottom edge 10A can be obtained. Therefore, the reference points can be easily determined by setting a first point on the central axis or at the apex of the bottom edge 10A, and providing a second point in the curve shape of the bottom edge 10A.

As described above, according to the present embodiment, the absolute value of the curvature radius of the contour of the edge of the end mill 10 can be directly obtained. Since the edge of the end mill 10 has a small curvature, and has a shape close to a flat shape, when contour data extracted from the imaging data of the actual end mill 10 and contour data of the end mill 10 which is a reference are compared with each other by fitting, it may not be able to distinguish wear of the end mill 10. On the other hand, since comparison is performed based on the absolute values, even when the shape has a small curvature, wear of the end mill 10 can be distinguished, and a change in shape of the end mill 10 can be accurately detected. In addition, in the end mill 10 having a complicated shape in which the bottom edge or the outer peripheral edge is smoothly connected to the radial edge, and which has a plurality of curvatures, fitting is difficult. On the other hand, since comparison is performed based on the absolute values, it is not necessary to perform fitting, and an inspection process can be simplified. As described above, when a change in shape is determined based on a difference between the values of the curvature radii, wear of the edge of the end mill 10 is easily specified.

When the chipping 60 occurring in the edge of the end mill 10 is specified, reference data regarding the reference shape of the end mill 10 is acquired, and the contour based on the acquired reference data and the contour of the end mill 10 extracted by the contour extraction unit 7 are compared with each other by fitting to determine a change in shape of the edge of the end mill 10.

As described above, the end mill inspection device 1 according to the present embodiment can accurately detect a change in shape of the end mill 10. Then, the quality of a processed surface can be satisfactorily maintained by changing processing conditions or replacing the end mill 10 based on a measurement result.

REFERENCE SIGNS LIST

1: End mill inspection device
2: Imaging unit
3: Inspection unit
4: Camera
5: Light source device
6: Imaging data acquisition unit (first acquisition unit)
7: Contour extraction unit
8: Curvature radius calculation unit
9: Reference data acquisition unit (second acquisition unit)
10: End mill
10A: bottom edge
10B: Radial edge
10C: Center edge
11: Determination unit
12: Memory
20: Processing device
21: Drive unit
22: Control unit
50: Workpiece
51: Planar portion
52: Fillet-shaped portion

The invention claimed is:

1. An end mill inspection device that inspects an end mill including a cutting edge formed in a curved convex shape and in an arc shape, the device comprising:
    a first acquisition unit that acquires imaging data of the cutting edge of the end mill, which is captured by an imaging unit;
    a contour extraction unit that extracts a contour of the cutting edge based on the imaging data acquired by the first acquisition unit; and
    a curvature radius calculation unit that calculates a curvature radius of the contour based on the contour of the cutting edge extracted by the contour extraction unit.

2. The end mill inspection device according to claim 1, further comprising:
    a second acquisition unit that acquires reference data regarding a reference shape of the end mill; and
    a determination unit that determines whether or not there is a change in shape of the cutting edge, based on a difference between a value of a reference curvature radius of the reference data acquired by the second acquisition unit and a value of the curvature radius calculated by the curvature radius calculation unit, and a predetermined threshold value.

3. The end mill inspection device according to claim 2, wherein a reference contour based on the reference data acquired by the second acquisition unit and the contour extracted by the contour extraction unit are compared with each other by fitting to determine the change in shape of the cutting edge.

4. The end mill inspection device according to claim 3, wherein the determination unit determines the change in shape of the cutting edge based on an area between the reference contour and the extracted contour or a distance between the reference contour and the extracted contour.

5. The end mill inspection device according to claim 1, wherein the cutting edge of the end mill includes a bottom edge or an outer peripheral edge formed in a curved convex shape and in an arc shape, and a radial edge provided at a corner and formed in an arc shape.

6. The end mill inspection device according to claim 5, wherein the bottom edge has a region in which a cutting portion is not formed on an axis of the end mill, and in the region of the bottom edge, a center edge is further provided, the center edge being formed in an arc shape having a smaller radius than a radius of an arc portion of the bottom edge.

* * * * *